United States Patent
Ragan

(10) Patent No.: US 9,371,194 B2
(45) Date of Patent: Jun. 21, 2016

(54) DIVERTING CONVEYOR WITH MAGNETICALLY DRIVEN MOVERS

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/768,977

(22) PCT Filed: Mar. 11, 2014

(86) PCT No.: PCT/US2014/022998
§ 371 (c)(1),
(2) Date: Aug. 19, 2015

(87) PCT Pub. No.: WO2014/159317
PCT Pub. Date: Oct. 2, 2014

(65) Prior Publication Data
US 2016/0001978 A1 Jan. 7, 2016

Related U.S. Application Data

(60) Provisional application No. 61/781,567, filed on Mar. 14, 2013.

(51) Int. Cl.
| | |
|---|---|
| B65G 47/84 | (2006.01) |
| B65G 17/34 | (2006.01) |
| B65G 17/08 | (2006.01) |
| B65G 47/34 | (2006.01) |

(52) U.S. Cl.
CPC .............. B65G 47/844 (2013.01); B65G 17/08 (2013.01); B65G 17/345 (2013.01); B65G 47/34 (2013.01)

(58) Field of Classification Search
CPC ...... B65G 17/08; B65G 17/345; B65G 47/34; B65G 47/844
USPC ................................ 198/890, 370.02, 370.13
See application file for complete search history.

(56) References Cited

U.S. PATENT DOCUMENTS

| | | | | |
|---|---|---|---|---|
| 3,731,782 | A * | 5/1973 | Del Rosso | ........... B65G 17/005 198/350 |
| 4,143,752 | A * | 3/1979 | Del Rosso | ........... B65G 17/005 198/358 |
| 4,618,052 | A * | 10/1986 | Rickett | .................. B65G 47/71 198/370.13 |
| 5,409,095 | A | 4/1995 | Hoshi et al. | |
| 5,473,210 | A * | 12/1995 | Someya | .................... H02K 1/17 29/607 |
| 5,732,814 | A * | 3/1998 | Owczarzak | .......... B65G 47/844 198/370.02 |

(Continued)

FOREIGN PATENT DOCUMENTS

| | | |
|---|---|---|
| EP | 1020380 A1 | 7/2000 |
| GB | 2284105 A | 5/1995 |
| JP | 2009040559 A | 2/2009 |

*Primary Examiner* — Gene Crawford
*Assistant Examiner* — Keith R Campbell
(74) *Attorney, Agent, or Firm* — James T. Cronvich

(57) ABSTRACT

A conveyor and method for moving articles across a conveying surface using electromagnetically operated movers in a conveyor belt. The movers are retained in tracks in the conveyor belt. A magnetic field source produces a magnetic field that varies across the width of the belt. The magnetic field interacts with electrically conductive material, ferromagnetic material, or permanent magnets in the movers to propel the movers and divert articles engaged by the movers across the belt. Movers with retractable pushers fold down at the sides of the belt to allow articles pushed by other movers to pass over and off the side of the belt.

20 Claims, 6 Drawing Sheets

(56) References Cited

U.S. PATENT DOCUMENTS

| | | | |
|---|---|---|---|
| 5,921,378 A * | 7/1999 | Bonnet | B65G 17/08 198/370.02 |
| 5,927,465 A | 7/1999 | Shearer, Jr. | |
| 5,967,289 A | 10/1999 | Kelsey | |
| 6,044,956 A * | 4/2000 | Henson | B65G 47/844 198/370.02 |
| 6,615,972 B2 | 9/2003 | Veit et al. | |
| 6,705,452 B2 | 3/2004 | Greve et al. | |
| 6,802,412 B2 | 10/2004 | Lapeyre et al. | |
| 6,814,216 B2 | 11/2004 | Veit et al. | |
| 6,938,750 B2 | 9/2005 | Miller et al. | |
| 7,240,781 B2 | 7/2007 | Ramaker et al. | |
| 8,333,274 B1 | 12/2012 | Lykkegaard | |
| 8,413,793 B2 | 4/2013 | Brutt | |
| 8,511,460 B2 | 8/2013 | Ragan et al. | |
| 8,985,304 B2 * | 3/2015 | Guernsey | B65G 47/844 198/370.07 |
| 2002/0096417 A1 | 7/2002 | Veit et al. | |
| 2003/0132143 A1 | 7/2003 | Cochran et al. | |
| 2007/0102325 A1 | 5/2007 | Boffo et al. | |

* cited by examiner

DIVERTING CONVEYOR WITH MAGNETICALLY DRIVEN MOVERS

BACKGROUND

The invention relates generally to power-driven conveyors and more particularly to shoe-type diverting conveyors.

Diverting conveyors, such as shoe sorters, are used to divert articles across the width of a conveyor as the conveyor transports the articles in a conveying direction. Typical shoe sorters include article-pushing elements referred to as shoes that are driven laterally across the conveyor to push articles off one or both sides of the conveyor to one or more outfeed locations. Slat conveyors and modular conveyor belts are used as the platform for the shoes, which ride in tracks extending across the widths of the slats or belt modules. The shoes are conventionally blocked-shaped with depending structural elements that keep the shoe in the track and serve as cam followers that extend below to be guided by carryway guides that control the lateral positions of the shoes. Although shoe sorters are widely used in package-handling applications, they are not so useful in food-handling and other applications where sanitation is important because they are not easy to clean. Another problem is the noise caused by impacts between the shoes and the carryway guides.

SUMMARY

One version of a conveyor embodying features of the invention comprises a conveyor belt and a magnetic field source. The conveyor belt has tracks that extend across the conveyor belt transverse to the direction of belt travel. Movers are retained in the tracks to move along the tracks across the belt. The movers have contact faces that engage articles conveyed on the belt. The magnetic field source provides a magnetic field that interacts with the movers to propel the movers along the tracks and conveyed articles engaged by the contact faces across the conveyor belt.

In another aspect of the invention, a conveyor comprises a conveyor belt having atop conveying surface and tracks that extend across the conveyor belt transverse to the direction of belt travel. Movers retained in the tracks move along the tracks across the belt. The movers have contact faces that engage articles conveyed on the belt. The movers include pushers on which the contact faces are formed to push conveyed articles across the top conveying surface in an extended position of the movers. Joints on the movers allow the pushers to fold down in a retracted position to a level at or below the top conveying surface.

In yet another aspect of the invention, a method for moving articles across the conveying surface of the conveyor comprises: (a) creating a magnetic field that varies spatially or temporally across the width of a conveyor; (b) coupling the magnetic field to movers mounted in the conveyor to propel the movers across the width of the conveyor with the varying magnetic field; and (c) engaging articles on the conveying surface of the conveyor with the movers to move the articles across the width of the conveying surface.

BRIEF DESCRIPTION OF THE DRAWINGS

These aspects and features of the invention are described in more detail in the following description, appended claims, and accompanying drawings, in which:

DETAILED DESCRIPTION

Figure 1:
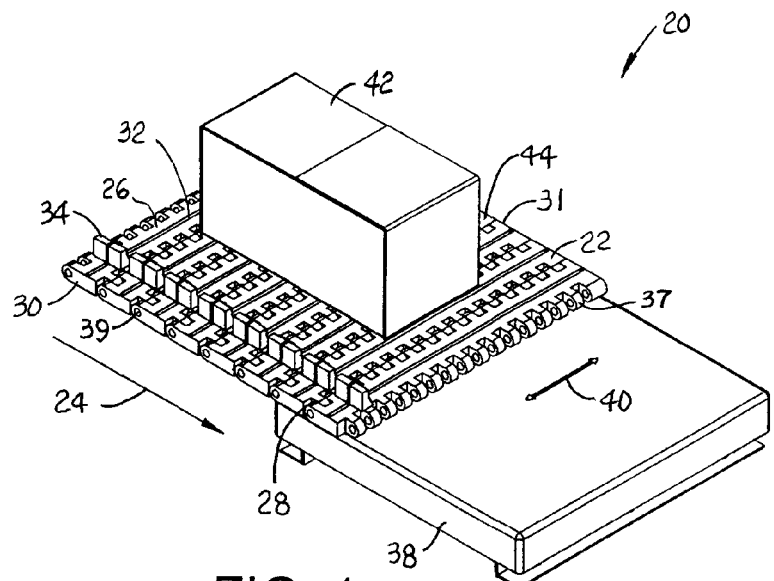
FIG. 1 is an isometric view of a portion of a diverting conveyor embodying features of the invention.
Figure 2:
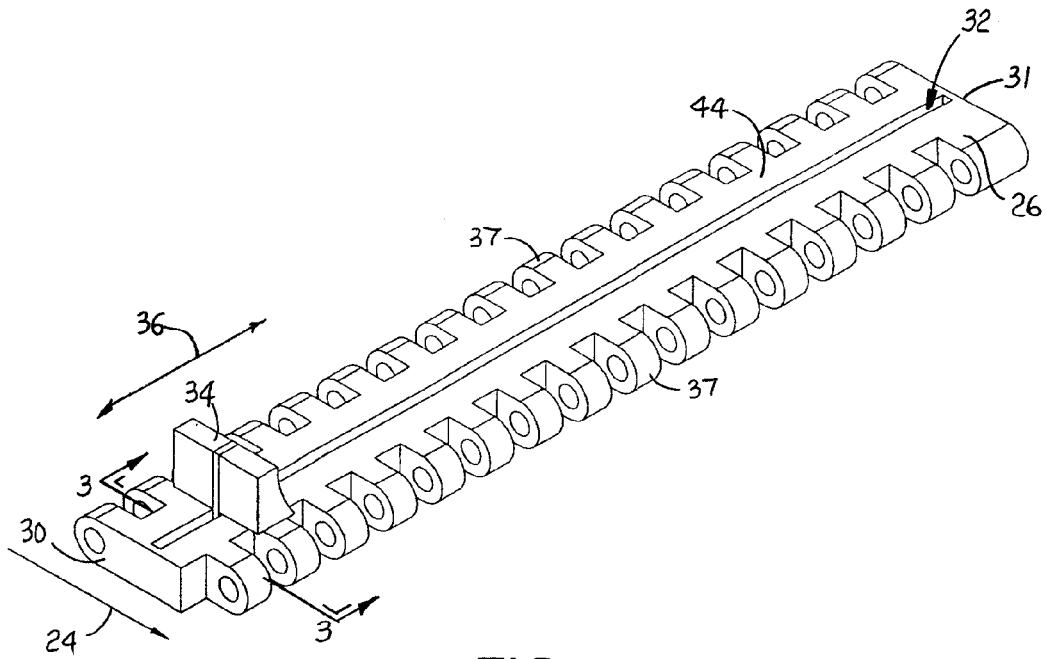
FIG. 2 is an isometric view of one version of a belt module usable in a conveyor as in FIG. 1.

A portion of a conveyor embodying features of the invention is shown in FIG. 1. The conveyor 20 comprises a conveyor belt 22 that advances in a direction of belt travel 24. The belt may be driven by any conventional drive means (not shown), such as motor-driven drums, pulleys, or sprockets, or by a linear induction motor. In the example shown, the conveyor belt is a modular plastic conveyor belt constructed of a series of belt modules 26 arranged in rows linked together at hinge joints 28, but a slat belt could alternatively be used. The conveyor belt 22 extends in width from a first outside edge 30 to an opposite second outside edge 31. Some or all of the modules—all, in the example of FIG. 1—have tracks 32 extending transversely across the width of the modules. As shown in FIGS. 1 and 2, a shoe, more generically, a mover 34, is retained in the track 32 of each belt module 26. The mover is able to slide along the track in both directions 36. Hinge elements 37 at opposite ends of each module are interleaved with the hinge elements of adjacent modules and linked by hinge pins 39 to form the hinge joints 28 between adjacent rows. A magnetic field source 38 positioned under the upper carryway path of the conveyor belt 22 produces a magnetic or electromagnetic field that varies spatially or temporally across the width of the conveyor in either direction, as indicated by two-headed arrow 40 in FIG. 1. The varying magnetic field interacts with metallic material in the movers 34 to propel the movers across the width of the belt without the contact present in cam-guided diverters. The movers divert articles 42 conveyed atop the belt's top conveying surface 44 across the belt to a selected lateral position or completely off the side of the belt. Magnetic field sources may be installed at selected positions along the length of the conveyor to provide additional divert zones or mover-return zones.

Figure 3:
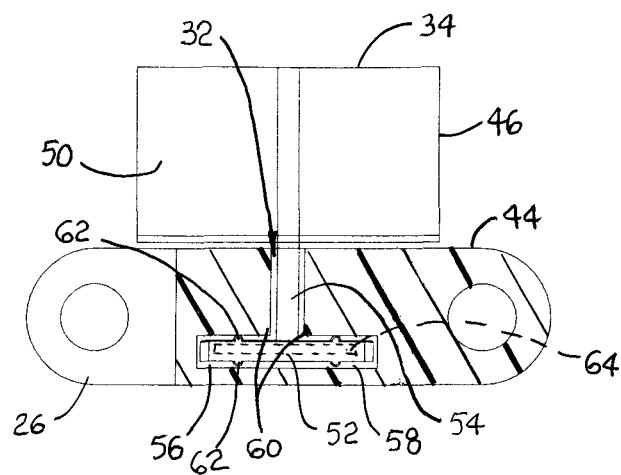
FIG. 3 is a cross section of the belt module of FIG. 2 taken along lines 3-3.
Figure 4:
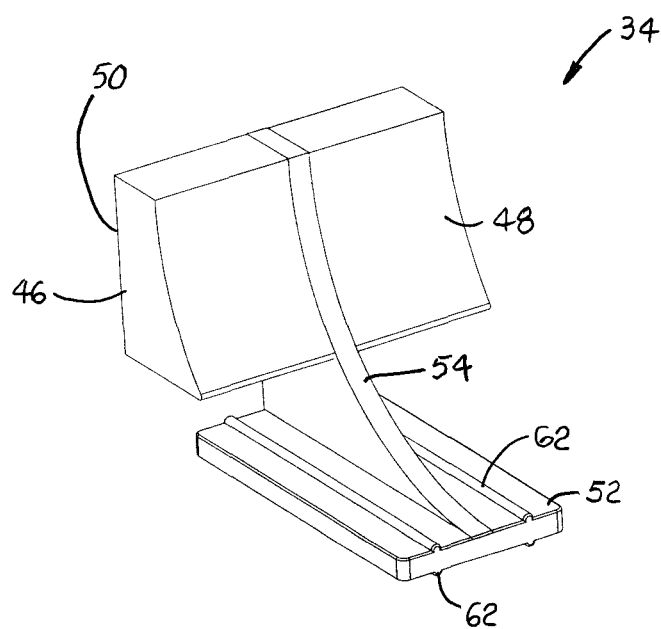
FIG. 4 is an isometric view of a mover for a conveyor as in FIG. 1.

As shown in FIGS. 3 and 4, the mover has a pusher portion 46 above the top conveying surface 44 of the belt. The pusher 46 has a contact face 48, which is shown as a curved surface in this example. The opposite side of the pusher has a flat surface 50. The pusher portion 46 is connected to a base 52 by an intermediate shank 54. The base 52 is retained in and rides transversely across the width of the belt module 26 in a slot 56 shaped like an inverted T. The base in this example serves as a skid 52 that rides in the base 58 of the inverted-T slot. The narrow shank 54 extends upward from the skid through the vertical branch of the inverted-T slot, which opens onto the top conveying surface 44 and forms the lateral track 32. Shoulders 60 formed in the interior of the belt module 26 retain the skid in the slot. Ridges 62 formed on top and bottom sides of the skid 52 reduce sliding friction with the walls bounding the base 58 of the slot and also reduce the wobble of the mover in the slot. Instead of a pusher, the mover could have a support plate with a flat horizontal upper contact surface engaging the bottoms of conveyed articles to divert the articles sitting on the contact face of the mover.

Figure 5:
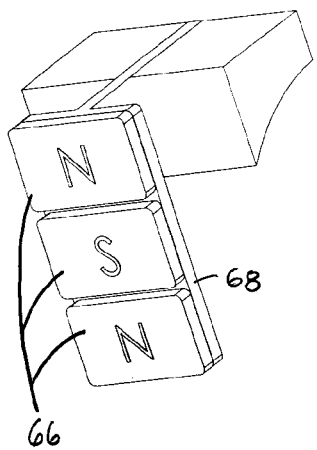
FIG. 5 is a bottom axonometric view of a mover usable in a conveyor as in FIG. 1 and having permanent magnets in its base.
Figure 6:
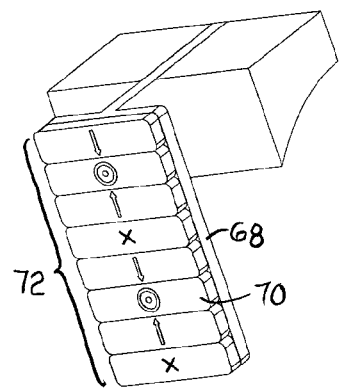
FIG. 6 is a bottom axonometric view of another mover usable in a conveyor as in FIG. 1 and having a Halbach array of magnets in its base.
Figure 7:
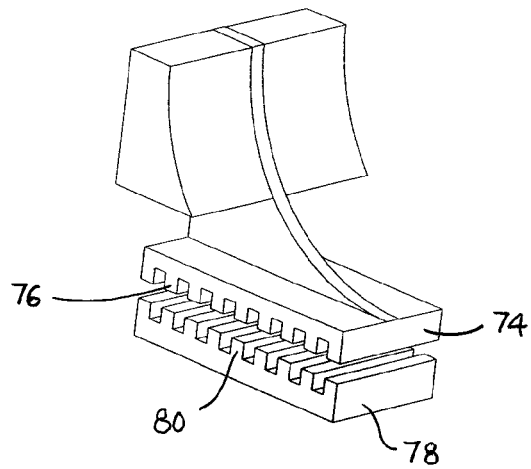
FIG. 7 is an isometric view of yet another mover usable in a conveyor as in FIG. 1 illustrating a mover with a toothed linear rotor driven by a linear stator.

The skid 52 includes ferromagnetic or electrically conductive metallic elements. The elements can be in the form of metal plates 64 housed in the skids or can be a metallic material combined with a plastic binder and molded to form the skid. The metal plate 64 could also be made of a ferromagnetic material layered atop an electrically conductive material for increased force. As another example, the metallic elements can be permanent magnets 66 housed within or attached to the base 68 as in FIG. 5. Permanent magnets 70 can be arranged with the base 68 in a Halbach array 72 as shown in FIG. 6 to focus their magnetic field toward the bottom of the conveyor belt and the magnetic field source. And, in the example shown in FIG. 7, the metallic element can be in the form of a ferromagnetic linear rotor, or forcer 74, having a series of teeth 76 forming poles. In this case, the magnetic field generator 38 used in the conveyor 20 of FIG. 1 comprises a stator 78 having poles 80 matching the teeth 76 to form a linear variable reluctance motor or a linear stepper motor with the rotor 74. The movers of FIGS. 5 and 6, whose metallic elements are permanent magnets, are driven transversely across the conveyor belt by the magnetic field source, which has a linear stator that is energized to produce a traveling magnetic field that interacts with the magnets. The linear stator may be operated with a permanent-magnet forcer as a synchronous ac motor or a brushless dc motor. When electrically conductive metallic elements are used in the mover, the magnetic field generator has a linear stator that produces a traveling magnetic field that induces a current in the electrically conductive metallic elements. The induced current produces a magnetic field in the mover that interacts with the traveling magnetic field to produce a force that propels the mover along the track. In this case, the magnetic field generator's stator and the mover's electrically-conductive forcer form a linear induction motor.

Figure 8A:
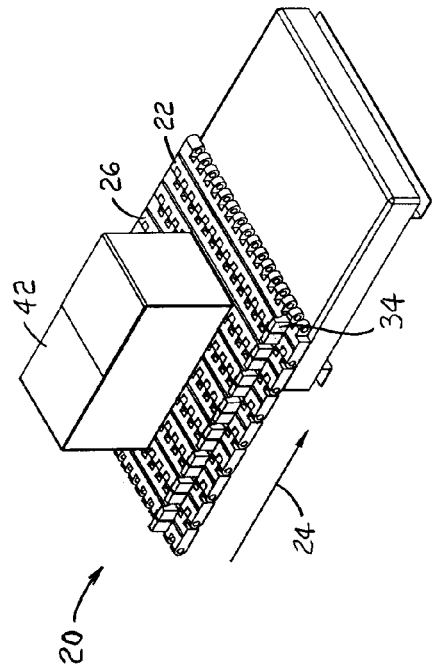
FIGS. 8A-8D are isometric views of the conveyor of FIG. 1 illustrating the step-by-step operation of the conveyor as a sorter.
Figure 8B:
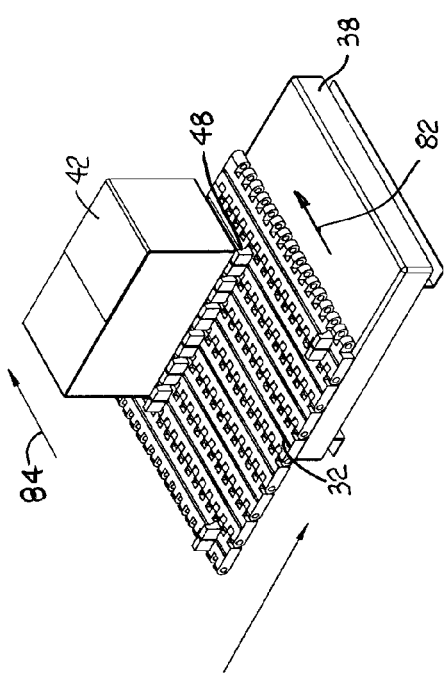
Figure 8C:
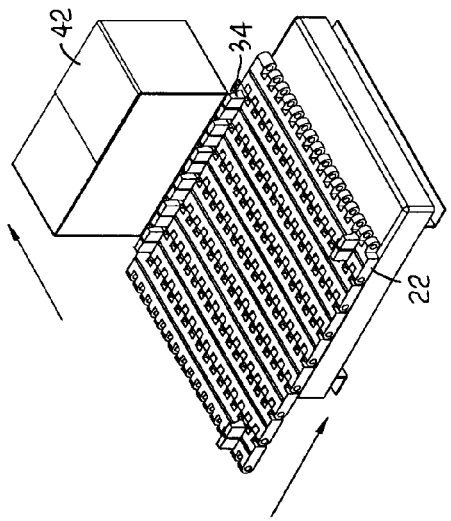
Figure 8D:
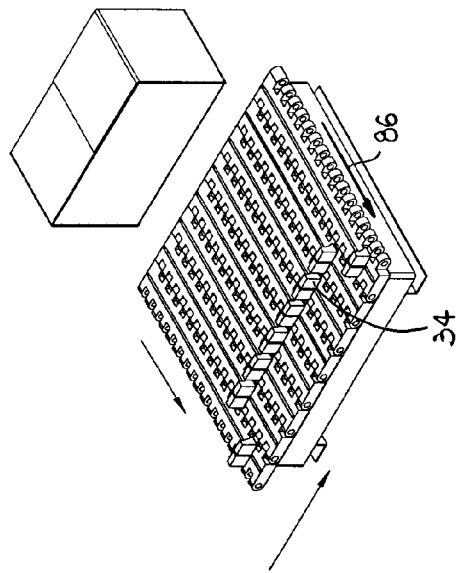
Figure 9:
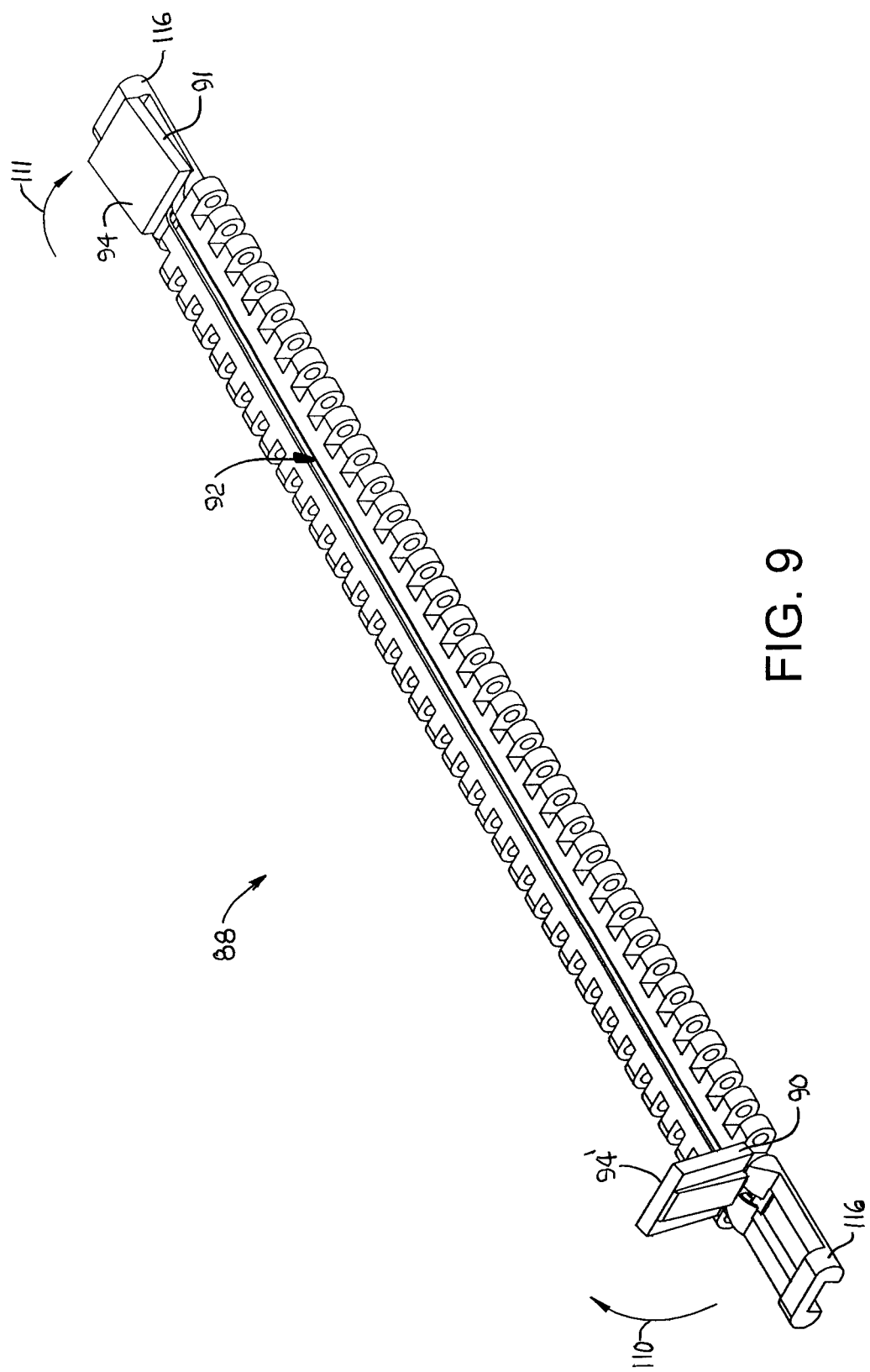
FIG. 9 is an isometric view of another version of a belt module usable in conveyor as in FIG. 1, in which the movers fold down from an extended position to a retracted position.

The operation of the conveyor 20 as a sorter is illustrated in FIGS. 8A-8D. In FIG. 8A, an article 42 is shown being conveyed by the conveyor belt 22 in a direction of belt travel 24. All the movers are shown in their reset positions at one side of the belt. In FIG. 8B, the magnetic field source 38 is activated to produce a magnetic field that intersects the conveyor and varies across the conveyor in the direction of arrow 82. The interaction of the magnetic field with the metallic elements in the movers 34 produces a force that propels the movers along their transverse tracks 32. The contact faces 48 of the movers engage the article 42 and push it across the top conveying surface 26 of the conveyor belt 22 in the direction of arrow 84. In FIG. 8C, the article 42 is shown pushed off the side of the conveyor belt 22 by the movers 34. In FIG. 8D, the magnetic field source 38 generates a magnetic field that varies in the opposite direction 86 to return the movers 34 to their reset position at the opposite side of the belt.

Figure 10:
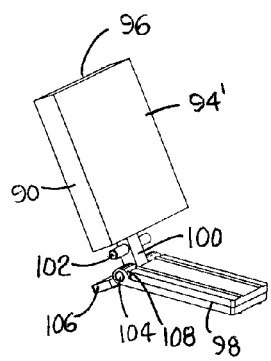
FIG. 10 is an axonometric view of a mover for use in a belt module as in FIG. 9.
Figure 11:
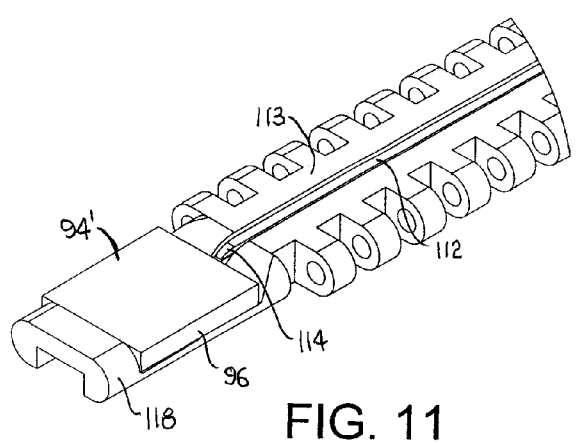
FIG. 11 is an enlarged view of an outside edge portion of the module of FIG. 9, showing the mover in a retracted position.
Figure 12A:
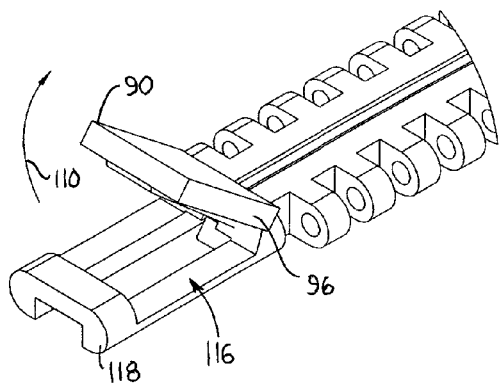
FIGS. 12A and 12B are enlarged views of the outside edge portion of the module of FIG. 9 showing the mover moving from a retracted position to an extended position.
Figure 12B:
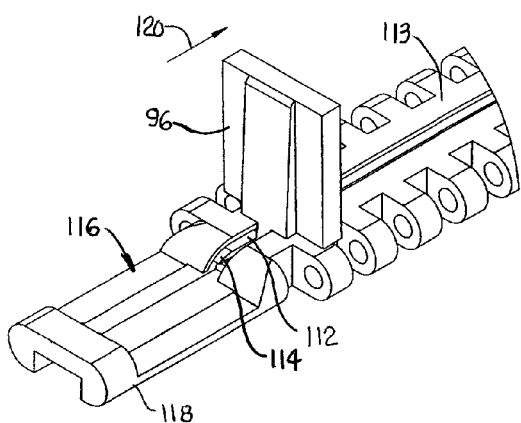

Another version of a conveyor belt module usable in a conveyor as in FIG. 1 is shown in FIGS. 9-12. The belt module 88 has two movers 90, 91 riding in the same track 92. The contact faces 94, 94' of the movers are shown as flat. The two faces 94, 94' face each other across the module. As shown in FIG. 10, each mover has an upper pusher 96 connected to a lower base or skid 98 by an intermediate shank 100. A pair of guide pins 102 and a pair of pivot pins 104 extend from the sides of the shank 100. The shank also includes a tab 106 extending away from the skid 98. The pivot pins 104 are received in hinge eyes 108 at one end of the skid 98. The resulting hinge joint allows the pusher 96 and the shank 100 to pivot relative to the skid 98, as indicated by the arrows 110, 111 in FIG. 9. The track 92 is formed by an inverted-T—shaped slot as in FIG. 3, but with a guide slot 112 parallel to the base portion 58 between the base portion and the top conveying surface 113 of the module 88, as best shown in FIGS. 11 and 12B. The mover's guide pins 102 are received in the guide slot 112. The guide slot 112 has a curved portion 114 that curves downward at each end of the track 92. The downward curve of the guide slot forces the pusher 96 and the shank 100 to pivot at the hinge until it rests flat in a recess 116 in each of the outside edges 118 of the module. In FIG. 11, the mover 90 is shown in its retracted position. The flat contact face 94' of the retracted pusher 96 is generally flush with or below the level of the top conveying surface 113 of the belt module. When the mover 90 is folded down in its retracted position, the other mover 91 can push an article off the side of the belt over the retracted mover 90 along the flat face 94' of the pusher 96. FIGS. 12A and 12B illustrate the mover's pusher 96 rising to an extended position for pushing articles across the belt. As the magnetic field forces the mover along the track in the direction of arrow 120, the guide pins riding up the curved portion of the guide slot pivot the mover 90 at its joint as indicated by arrow 110 to its unfolded, extended position in FIG. 12B. Movers with pivotable pushers may be used in more conventional cam-guided diverting conveyors, as well as in the magnetically driven movers previously described.

What is claimed is:

1. A conveyor comprising:
   a conveyor belt including:
      a plurality of tracks extending across the conveyor belt transverse to the direction of belt travel;
      a plurality of movers retained in the tracks to move along the tracks across the conveyor belt, the movers having metallic elements and contact faces for engaging conveyed articles;
   a magnetic field source including a stator providing a magnetic field that interacts with the metallic elements in the movers to propel the movers along the tracks and conveyed articles engaged by the contact faces transversely across the conveyor belt;
   wherein the stator forms a linear motor with the metallic elements operating as forcers driven by the stator.

2. A conveyor as in claim 1 wherein the metallic elements are electrically conductive and the stator forms a linear induction motor with the metallic elements.

3. A conveyor as in claim 1 wherein the metallic elements are permanent magnets and the stator forms a linear synchronous motor with the metallic elements.

4. A conveyor as in claim 1 wherein the metallic elements are permanent magnets arranged in Halbach arrays and the stator forms a linear synchronous or a brushless dc motor with the metallic elements.

5. A conveyor as in claim 1 wherein the metallic elements are made of a ferromagnetic material combined with a plastic binder and molded to form at least a portion of the movers.

6. A conveyor as in claim 1 wherein the metallic elements are made of a ferromagnetic material on an electrically conductive material.

7. A conveyor as in claim 1 wherein the metallic elements are made of a ferromagnetic material and have a series of teeth and wherein the stator has poles matching the teeth to form the linear motor with the metallic elements.

8. A conveyor as in claim 1 wherein the movers include metal plates.

9. A conveyor as in claim 1 wherein the conveyor belt includes a top conveying surface and wherein the tracks comprise transverse slots within the conveyor belt that open onto the top conveying surface and wherein the metallic elements reside in the slots and wherein the contact faces reside at or above the top conveying surface.

10. A conveyor as in claim 9 wherein the slots have an inverted-T shape and the movers include bases containing the metallic elements and the movers include shanks connected between the bases and the contact faces and wherein the bases are slidably retained in the inverted-T-shaped slots.

11. A conveyor as in claim 1 wherein the metallic elements are disposed in the movers below the contact faces and wherein the magnetic field source is disposed below and proximate to the conveyor belt across a gap.

12. A conveyor as in claim 1 wherein the conveyor belt includes a top conveying surface and wherein the movers include pushers on which the contact faces are formed to push conveyed articles across the top conveying surface in an extended position of the movers and wherein hinges on the movers allow the pushers to fold down in a retracted position to a level at or below the top conveying surface.

13. A conveyor as in claim 12 wherein the contact faces are flush with or below the level of the top conveying surface when the pushers are in the retracted position.

14. A conveyor as in claim 12 comprising two movers in each track and wherein each of the pushers folds down at a respective outside edge of the conveyor belt to allow the other pusher to push conveyed articles off the side edge over the folded-down pusher.

15. A conveyor comprising:
a conveyor belt having a top conveying surface and including:
a plurality of tracks extending across the conveyor belt transverse to the direction of belt travel;
a plurality of movers retained in the tracks to move along the tracks across the conveyor belt, the movers having contact faces for engaging conveyed articles;
wherein the movers include pushers on which the contact faces are formed to push conveyed articles across the top conveying surface in an extended position of the movers and joints allowing the pushers to fold down in a retracted position of the movers to a level at or below the level of the top conveying surface.

16. A conveyor as in claim 15 wherein the contact faces are flush with or below the level of the top conveying surface when the pushers are in the retracted position.

17. A conveyor as in claim 15 comprising two movers in each track and wherein each of the pushers folds down at a respective outside edge of the conveyor belt to allow the other pusher to push conveyed articles off the side edge over the folded-down pusher.

18. A conveyor as in claim 15 further comprising a magnetic field source providing a magnetic field that interacts with the movers to propel the movers along the tracks and conveyed articles engaged by the contact faces in the extended position transversely across the conveyor belt.

19. A method for moving articles across the conveying surface of a conveyor, comprising:
creating a magnetic field that varies spatially or temporally across the width of a conveyor with a linear stator;
coupling the magnetic field to metallic elements in movers mounted in the conveyor to propel the movers across the width of the conveyor with the varying magnetic field;
engaging articles on a conveying surface of the conveyor with the movers to move the articles across the width of the conveying surface.

20. The method of claim 19 further comprising lowering the movers to a level at or below the level of the conveying surface at an outside edge of the conveyor.

* * * * *